United States Patent
Tsujii (10) Patent No.: US 8,760,701 B2
(45) Date of Patent: Jun. 24, 2014

(54) ELECTRONIC DEVICE WITH BACKED-UP MEMORY, AND CONTROL METHOD AND STORAGE MEDIUM THEREFOR

(75) Inventor: Hiroto Tsujii, Kawasaki (JP)

(73) Assignee: Canon Kabushiki Kaisha (JP)

( * ) Notice: Subject to any disclaimer, the term of this patent is extended or adjusted under 35 U.S.C. 154(b) by 140 days.

(21) Appl. No.: 13/575,787

(22) PCT Filed: May 31, 2012

(86) PCT No.: PCT/JP2012/064610
§ 371 (c)(1),
(2), (4) Date: Jul. 27, 2012

(87) PCT Pub. No.: WO2012/169561
PCT Pub. Date: Dec. 13, 2012

(65) Prior Publication Data
US 2012/0314243 A1      Dec. 13, 2012

(30) Foreign Application Priority Data

Jun. 7, 2011   (JP) ................................ 2011-127480

(51) Int. Cl.
*G06K 15/00*      (2006.01)
(52) U.S. Cl.
USPC ....... 358/1.15; 358/1.13; 358/1.14; 358/1.16; 455/572
(58) Field of Classification Search
CPC ............ B41J 3/36; G06F 3/1221; G06F 1/30; G06F 11/1402; H04N 2201/0096
USPC .................................. 358/1.13–1.17; 455/572
See application file for complete search history.

(56) References Cited

U.S. PATENT DOCUMENTS

| | | | | |
|---|---|---|---|---|
| 5,263,152 A | * | 11/1993 | Smith et al. | 714/5.11 |
| 5,714,994 A | * | 2/1998 | Suzuki et al. | 347/190 |
| 6,081,663 A | * | 6/2000 | Takahashi et al. | 703/20 |
| 2001/0019964 A1 | * | 9/2001 | Shimizu | 455/557 |
| 2004/0189811 A1 | * | 9/2004 | Ishiyama et al. | 348/207.2 |
| 2004/0253981 A1 | * | 12/2004 | Blume et al. | 455/552.1 |

FOREIGN PATENT DOCUMENTS

| | | |
|---|---|---|
| JP | 06-174809 A | 6/1994 |
| JP | 07-007579 A | 1/1995 |
| JP | 10-233867 A | 9/1998 |
| JP | 2009-077070 A | 4/2009 |

OTHER PUBLICATIONS

International Search Report for PCT/JP2012/064610, mail date Sep. 11, 2012.

* cited by examiner

*Primary Examiner* — Dennis Dicker
(74) *Attorney, Agent, or Firm* — Rossi, Kimms & McDowell LLP

(57) ABSTRACT

An electronic device is provided that is capable of dealing with data loss from a volatile memory that can be caused when power supply from a device power source is disconnected. Even if there is a setting to retain received data in the volatile memory until a printing instruction is given by a user, the electronic device, e.g., an image forming apparatus, prints received data without waiting for the user's printing instruction in a case where a backup battery voltage is less than a predetermined value.

10 Claims, 6 Drawing Sheets

REDUCTION OCCURS IN RESIDUAL CAPACITY OF BACKUP BATTERY FOR FAX DATA.
DO YOU WISH TO PRINT DOCUMENT?

YES  NO

REDUCTION OCCURS IN RESIDUAL CAPACITY OF BACKUP BATTERY FOR FAX DATA.
DO YOU WISH TO CANCEL FORCED MEMORY RECEPTION?

YES  NO

ELECTRONIC DEVICE WITH BACKED-UP MEMORY, AND CONTROL METHOD AND STORAGE MEDIUM THEREFOR

This application is a U.S. National Phase Application of PCT International Application PCT/JP2012/064610 filed on May 31, 2012 which is based on and claims priority from JP 2011-127480 filed on Jun. 7, 2011 the contents of which is incorporated herein in its entirety by reference.

TECHNICAL FIELD

The present invention relates to an electronic device in which a volatile memory is battery-backed up when power supply from a device power source is disconnected, a control method therefor, and a storage medium storing a program for executing the control method.

BACKGROUND ART

A volatile memory, which is incorporated in an electronic device such as an image forming apparatus, is normally supplied with power from a device power source (i.e., a power source of the electronic device), but from a backup battery when the power supply from the device power source is disconnected, whereby data can be kept retained in the volatile memory.

In, e.g., PTL 1, a memory board is proposed that changes the power supply source for a volatile memory from a device body as a drive power source to a backup battery and prohibits writing to the volatile memory when a detected voltage of power supplied from the drive power source becomes equal to or less than a predetermined value.

CITATION LIST

Patent Literature

{PTL 1} Japanese Laid-open Patent Publication No. H6-174809

SUMMARY OF INVENTION

Technical Problem

There is an electronic device having a facsimile function and configured to retain received data in a volatile memory until a print-output instruction is given by a user.

However, if a long period of time elapses after the power supply source for the volatile memory is changed from the device power source to the backup battery and before power supply from the device power source is restarted, power supply from the backup battery stops, so that data retained in the volatile memory is lost.

With the memory board described in PTL 1 that only prohibits writing to the volatile memory when the power supply source for the volatile memory is changed from the drive power source to the backup battery, it is impossible to protect data held in the volatile memory when the power supply from the backup battery stops due to lapse of a long period of time after the change from the drive power source to the backup battery.

The present invention provides an electronic device capable of dealing with data loss from a volatile memory that can be caused when power supply from a device power source is disconnected, a control method therefor, and a storage medium storing a program for executing the control method.

Solution to Problem

Accordingly, one aspect of this invention provides an electronic device comprising a volatile memory configured to be supplied with power from a device power source or from a backup battery, a switching unit configured, in a case where power supply from the device power source is disconnected, to change a power supply source such that power is supplied from the backup battery to the volatile memory, a reception unit configured to receive data from an external device, a printing unit configured to print data received by the reception unit, and a setting unit configured to make a setting to retain data received by the reception unit in the volatile memory until a user's printing instruction is given, wherein in a case where a voltage of the backup battery is less than a predetermined value, data received by the reception unit is printed by the printing unit without waiting for the user's printing instruction, even if the setting to retain data in the volatile memory is made by the setting unit.

The features and advantages of the invention will become more apparent from the following detailed description taken in conjunction with the accompanying drawings.

Advantageous Effects of Invention

With this invention, it is possible to deal with data loss from the volatile memory of the electronic device that can be caused when power supply from the device power source is disconnected.

DESCRIPTION OF EMBODIMENTS

The present invention will now be described in detail below with reference to the drawings showing preferred embodiments thereof.

Figure 1:
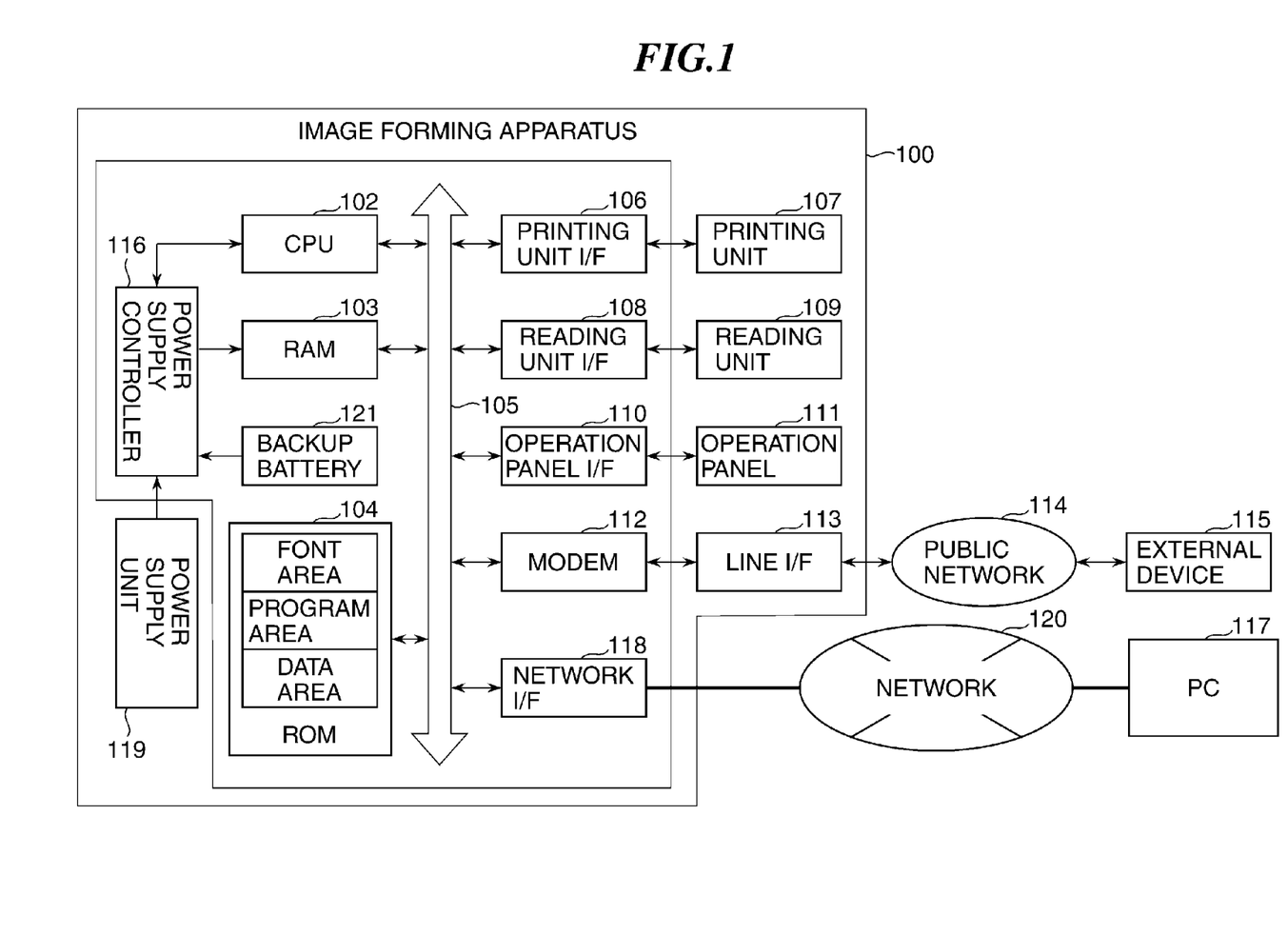
FIG. 1 A block diagram showing an example hardware structure of an image forming apparatus, which is an electronic device according to a first embodiment of this invention.

FIG. 1 shows in block diagram an example hardware structure of an image forming apparatus, which is an electronic device according to a first embodiment of this invention.

As shown in FIG. 1, the image forming apparatus 100 of this embodiment includes a printing unit 107, reading unit 109, operation panel 111, and line I/F 113, and includes a controller unit 101 that controls them. The image forming apparatus 100 also includes a power supply unit 119.

The controller unit 101 includes a CPU 102, RAM 103, ROM 104, printing unit I/F 106, reading unit I/F 108, operation panel I/F 110, modem 112, and network I/F 118, which are connected to a system bus 105.

The controller unit 101 further includes a power supply controller 116 to which the power supply unit 119 and a backup battery 121 are connected. The power supply unit 119 is a device power source that supplies power to respective parts of the image forming apparatus 100 (an illustration of power supply paths from the power supply unit 119 to respective apparatus parts is omitted in FIG. 1). Under the control of the CPU 102, the power supply controller 116 selects either the power supply unit 119 or the backup battery 121, as the power supply source for the RAM 103. It should be noted that the power supply controller 116 has a function of detecting the voltage of the backup battery 121.

The CPU 102 overall controls the image forming apparatus 100. To this end, the CPU 102 loads a control program stored, e.g., in a program area of the ROM 104 or in an HDD (not shown) into the RAM (volatile memory) 103 and executes the loaded control program, thereby executing predetermined processing.

When power supply from the power supply unit 119 is disconnected, the CPU 102 (switching unit) controls the power supply controller 116 to change the power supply source for the RAM 103 from the power supply unit 119 to the backup battery 121, whereby power is supplied from the backup battery 121 to the RAM 103.

The network I/F 118 communicates with a PC (personal computer) 117 via a network 120 such as a LAN. The modem 112 is connected through the line I/F 112 and the public network 114 to an external device 115, such as an image forming apparatus (other than the image forming apparatus 100), facsimile apparatus, and telephone set, for communication with the external device 115.

The printing unit I/F 106 is an interface that outputs an image signal to the printing unit (printer engine) 107. The reading unit I/F 108 is an interface that inputs a reading image signal from the reading unit (scanner engine) 109.

The CPU 102 performs predetermined processing on the image signal input from the reading unit 109 via the reading unit I/F 108, and outputs the processed image signal to the printing unit 107 via the printing unit I/F 106.

The operation panel 110 is an interface for input/output with the operation panel 111. The CPU 102 outputs via the operation panel I/F 110 to the operation panel 111 data such as characters and symbols to be displayed on a display region of the operation panel 111 by using font information stored in a font area of the ROM 104, whereby the data is displayed on the display region of the operation panel 111. The CPU 101 accepts via the operation panel I/F 111 a user's instruction input through the operation panel 110.

The ROM 104 has a data area stored with apparatus information about the image forming apparatus 100, user's telephone book information, etc. so as to be able to be read and updated by the CPU 102 as needed.

Next, a description will be given of a facsimile (hereinafter referred to as the FAX) function of the image forming apparatus 100.

In FAX transmission, image data read by the reading unit 109 is temporarily retained in the RAM 103, and then transmitted from the modem 112 to the external device 115 via the public network 114. After completion of the transmission, the image data retained in the RAM 103 is deleted.

In FAX reception, image data received from the external device 115 by the modem 112 via the public network 114 is retained in the RAM 103 and then output to the printing unit 107. After completion of the printing of the image data by the printing unit 107, the image data retained in the RAM 103 is deleted.

The image forming apparatus 100 has a function of forced memory reception. The forced memory reception is set by the user by performing an operation for selecting the forced memory reception on the operation panel 111. When the forced memory reception is set, image data received from the external device 115 by the modem 112 via the public network 114 is kept retained in the RAM 103. When an operation for canceling the forced memory reception setting is performed by the user on the operation panel 111, the image data is output to the printing unit 107. After completion of the printing of the image data by the printing unit 107, the image data retained in the RAM 103 is deleted.

Even if the forced memory reception is set, when a detected voltage of the backup battery 121 becomes less than a predetermined value in a state that power is supplied from the power supply unit 119 to the RAM 103, received image data is retained in the RAM 103 and output to the printing unit 107. After completion of the printing of the image data by the printing unit 107, the image data retained in the RAM 103 is deleted.

Figure 2:
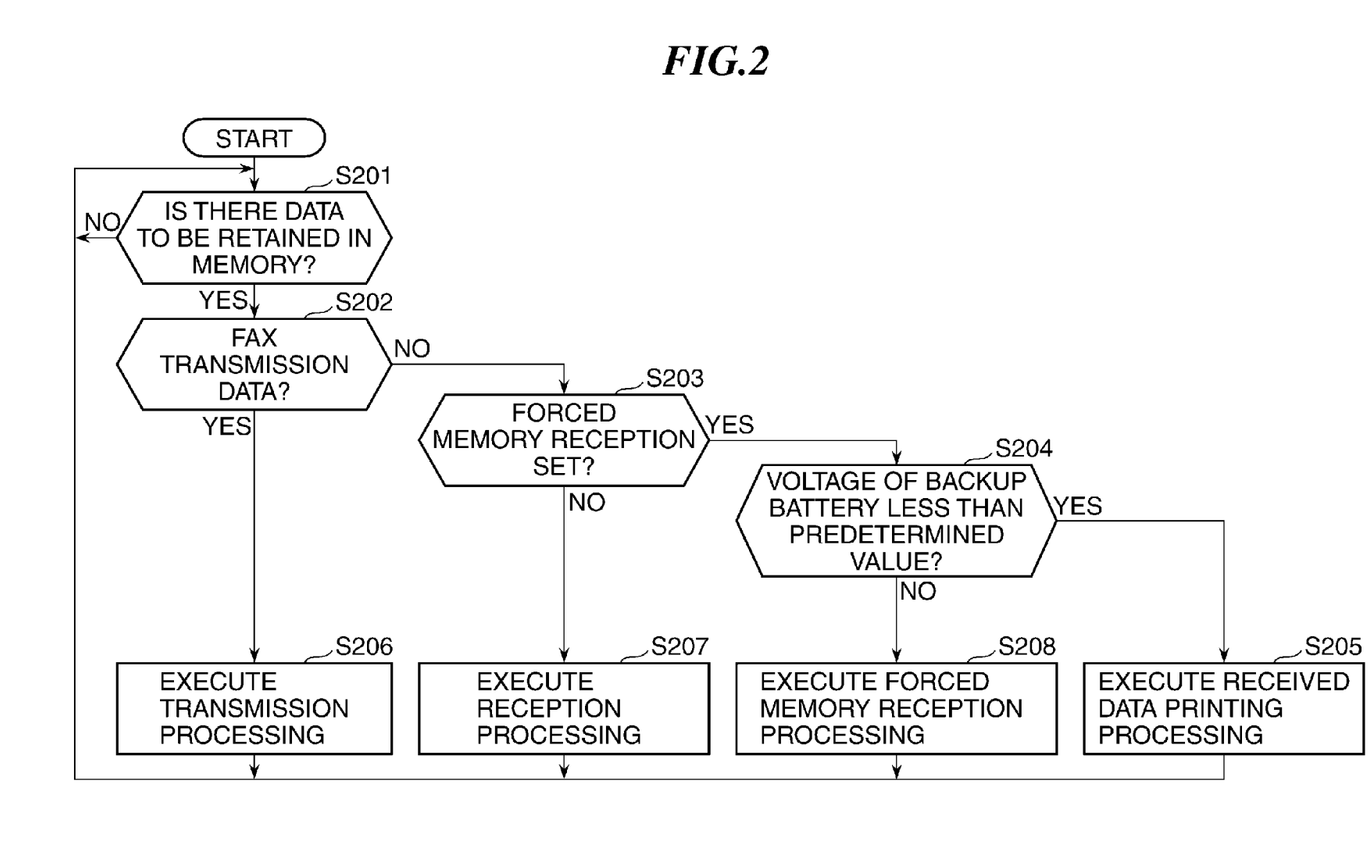
FIG. 2 A flowchart showing an example operation of the image forming apparatus at FAX communication.

Next, with reference to FIG. 2, an example operation of the image forming apparatus 100 at FAX communication will be described. In this example, it is assumed that power is supplied from the power supply unit 119 to the RAM 103.

In step S201, the CPU 102 determines whether there is data to be retained in the RAM 103. If the answer to step S202 is NO, the flow returns to step S201. On the other hand, if there is data to be retained in the RAM 103, the flow proceeds to step S202.

In step S202, the CPU 102 determines whether the data to be retained in the RAM 103 is FAX transmission data. If the data to be retained in the RAM 103 is FAX transmission data (i.e., if YES to step S202), the flow proceeds to step S206. If the data to be retained in the RAM 103 is FAX reception data (i.e., if NO to step S202), the flow proceeds to step S203.

In step S206, the CPU 102 executes transmission processing. More specifically, the CPU 102 temporarily retains image data read by the reading unit 109 in the RAM 103, transmits the image data to the external device 115 from the modem 112 via the public network 114, and deletes the image data retained in the RAM 103 after completion of transmission of the image data, whereupon the flow returns to step S201.

In step S203, the CPU 102 determines whether or not the forced memory reception is set. If the forced memory reception is not set, the flow proceeds to step S207. On the other hand, if the forced memory reception is set, the flow proceeds to step S204.

In step S207, the CPU 102 executes reception processing. More specifically, the CPU 102 (reception unit) retains image data received by the modem 112 from the external device 115 via the public network 114 in the RAM 103, outputs the image data to the printing unit 107, and deletes the image data retained in the RAM 103 after completion of the printing of the image data by the printing unit 107, whereupon the flow returns to step S201.

In step S204, the CPU 102 determines whether a voltage of the backup battery 121 detected by the power supply controller 116 is less than a predetermined value. If the battery voltage is less than the predetermined value, the flow proceeds to step S205. If the battery voltage is equal to or greater than the predetermined value, the flow proceeds to step S208.

In step S208, the CPU 102 executes forced memory reception processing in which image data received by the modem 112 from the external device 115 via the public network 114 is kept retained in the RAM 103, whereupon the flow returns to step S201. It should be noted that when an operation to cancel the forced memory reception setting is performed by the user on the operation panel 111, the CPU 102 outputs the image data retained in the RAM 103 to the printing unit 107, and deletes the image data retained in the RAM 103 after completion of the printing of the image data by the printing unit 107.

In step S205, the CPU 102 (deletion unit) executes received data printing processing. More specifically, the CPU 102 retains image data received by the modem 112 from the external device 115 via the public network 114 in the RAM 103, outputs the image data to the printing unit 107, and deletes the image data retained in the RAM 103 after completion of the printing of the image data by the printing unit 107, whereupon the flow returns to step S201.

As described above, in this embodiment, in a case where the forced memory reception is set, received image data is retained in the RAM 103 and output to the printing unit 107 to print the image data when the voltage of the backup battery 121 is less than the predetermined value. It is therefore possible to deal with a situation where image data to be retained in the RAM 103 can be lost as a result that power supply from the power supply unit 119 is disconnected in a state that the voltage of the backup battery 121 becomes low and subsequent power supply from the backup battery 121 stops with lapse of time before the forced memory reception setting is cancelled by the user.

Figure 3:
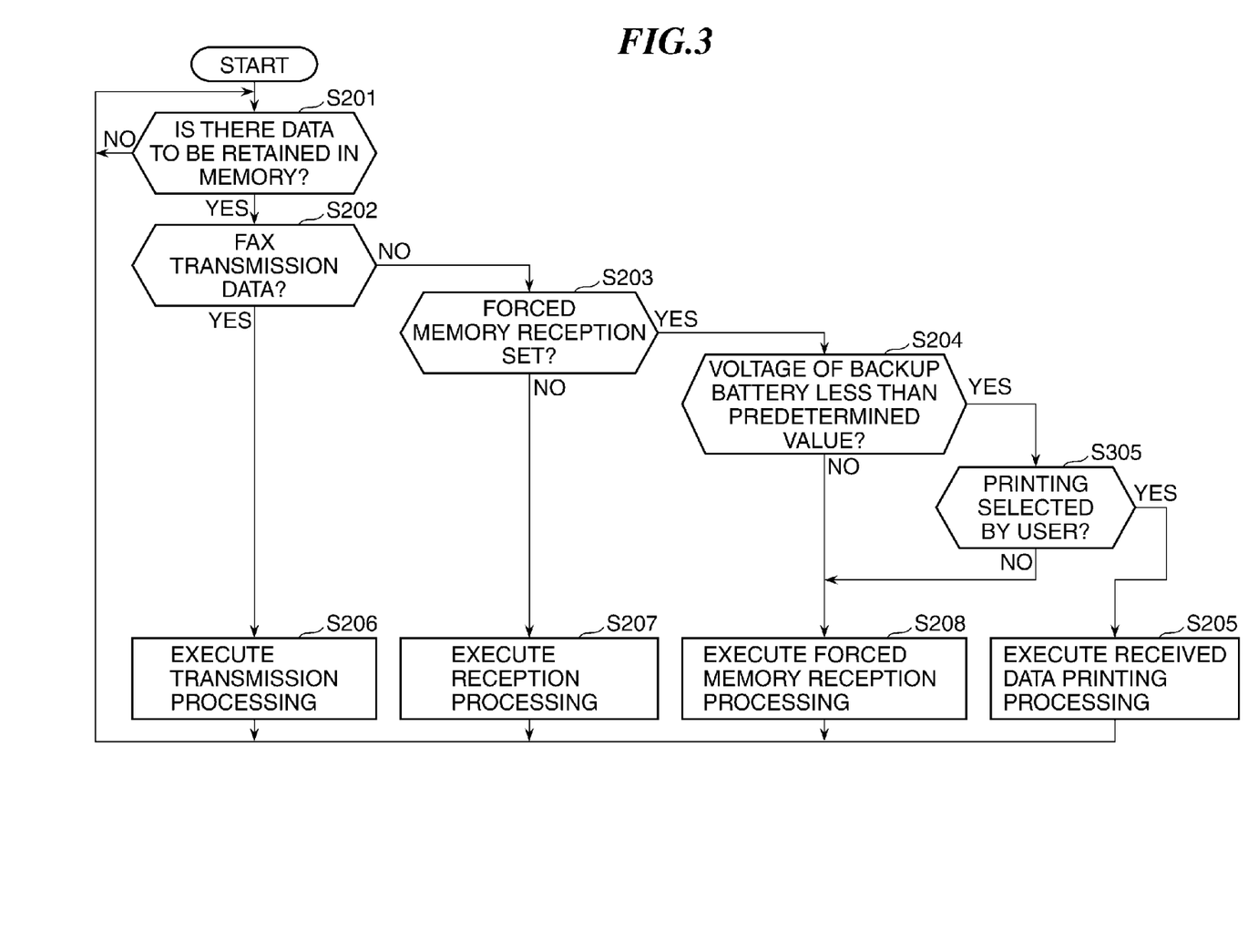
FIG. 3 A flowchart showing an example operation of an image forming apparatus, which is an electronic device according to a second embodiment of this invention, at FAX communication.
Figure 4:
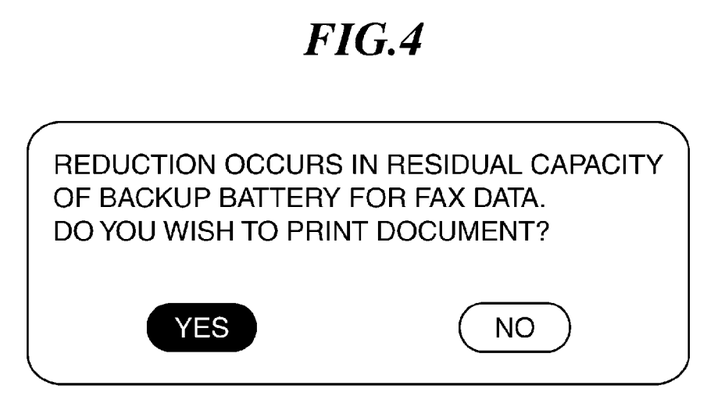
FIG. 4 A view showing an example of a printing selection screen displayed on an operation panel of the image forming apparatus during the FAX communication operation shown in FIG. 3.

Next, with reference to FIGS. 3 and 4, a description will be given of a FAX communication operation of an image forming apparatus, which is an electronic device according to a second embodiment of this invention. FIG. 3 shows in flowchart an example operation of the image forming apparatus at FAX communication, and FIG. 4 shows an example of a printing selection screen displayed on an operation panel of the image forming apparatus. It should be noted that the construction and operation of the image forming apparatus of this embodiment are basically the same as those of the first embodiment, and a description of points common to both the embodiments will be omitted.

In FIG. 3, if it is determined by the CPU 102 in step S204 that the voltage of the backup battery 121 is less than the predetermined value, the flow proceeds to step S305. If it is determined that the battery voltage is equal to or greater than the predetermined value, the flow proceeds to step S208.

In step S305, the CPU 102 controls the operation panel 110 to display a printing selection screen for prompting the user to select whether a document should be printed, as shown in FIG. 4. If "YES (printing)" is selected by the user on the printing selection screen shown in FIG. 4, the flow proceeds to step S205 where the CPU 102 executes the received data printing processing, which is already described with reference to FIG. 2. On the other hand, if "NO (non-printing)" is selected by the user, the flow proceeds to step S208 where the CPU 102 executes the forced memory reception processing, which is already described with reference to FIG. 2.

Figure 5:
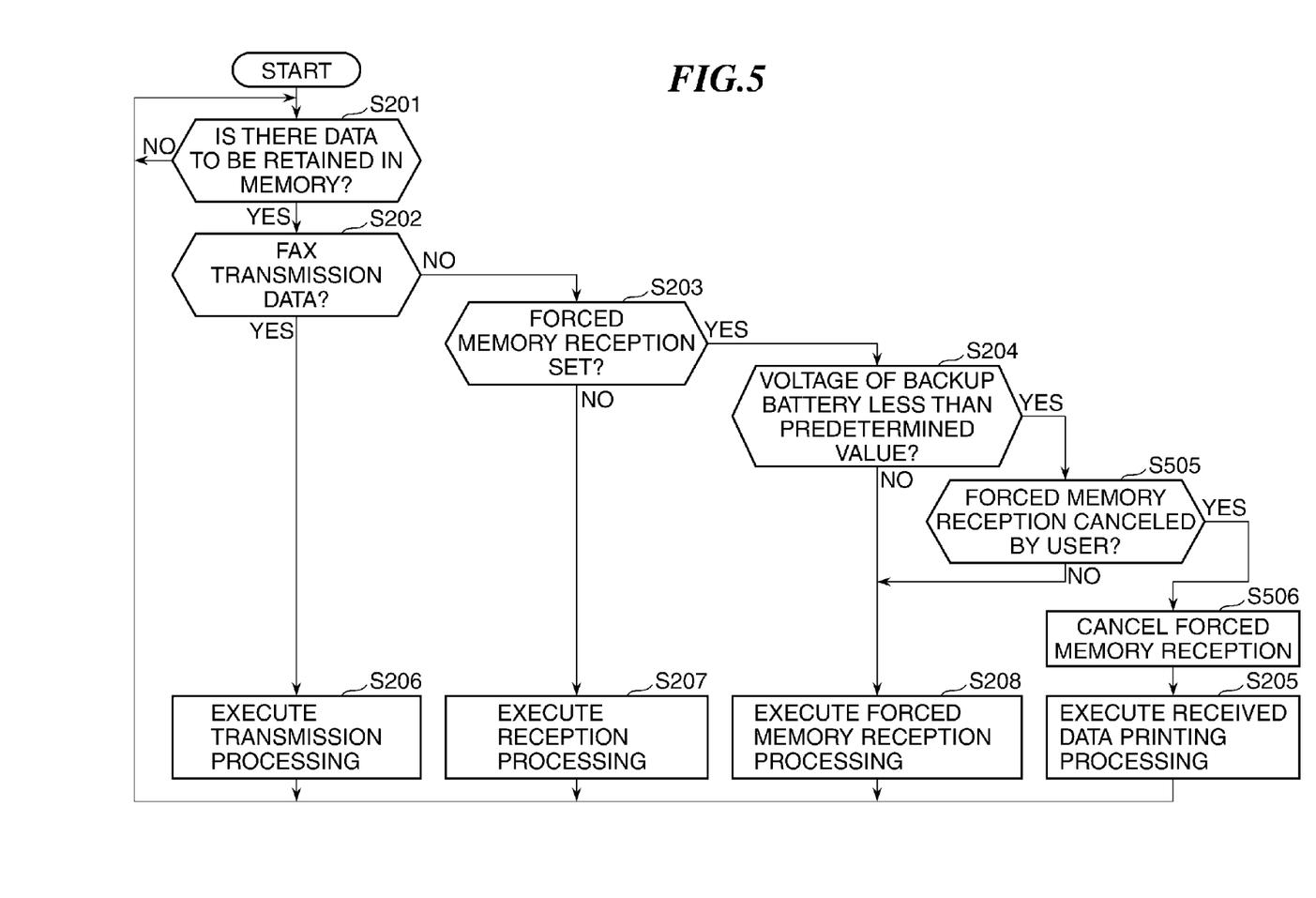
FIG. 5 A flowchart showing an example operation of an image forming apparatus, which is an electronic device according to a third embodiment of this invention, at FAX communication.
Figure 6:
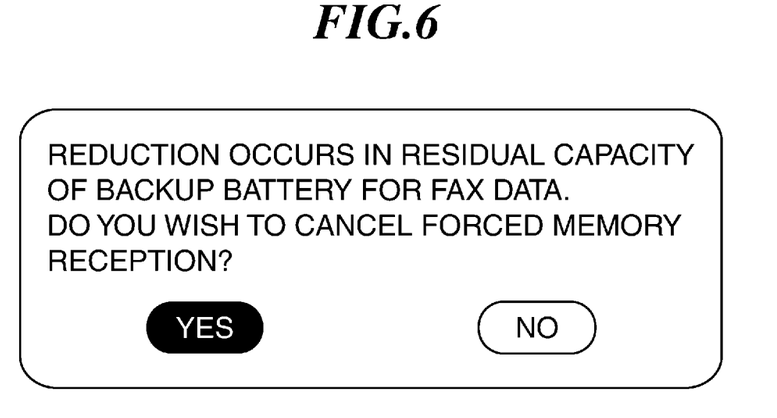
FIG. 6 A view showing an example of a forced memory reception cancel screen displayed on an operation panel of the image forming apparatus during the FAX communication operation shown in FIG. 5.

Next, with reference to FIGS. 5 and 6, a description will be given of a FAX communication operation of an image forming apparatus, which is an electronic device according to a third embodiment of this invention. FIG. 5 shows in flowchart an example operation of the image forming apparatus at FAX communication, and FIG. 6 shows an example of a forced memory reception cancel screen displayed on an operation panel of the image forming apparatus. It should be noted that the construction and operation of the image forming apparatus of this embodiment are basically the same as those of the first embodiment, and a description of points common to both the embodiments will be omitted.

In FIG. 5, if it is determined by the CPU 102 in step S204 that the voltage of the backup battery 121 is less than the predetermined value, the flow proceeds to step S505. If it is determined that the battery voltage is equal to or greater than the predetermined value, the flow proceeds to step S208.

In step S505, the CPU 102 controls the operation panel 110 to display a forced memory reception cancel screen for prompting the user to select whether the forced memory reception setting should be cancelled, as shown in FIG. 6. If "YES (cancel)" is selected by the user on the selection screen shown in FIG. 6, the flow proceeds to step S506. On the other hand, if "NO (not cancel)" is selected by the user, the flow proceeds to step S208 where the CPU 102 executes the forced memory reception processing, which is already described with reference to FIG. 2.

In step S506, the CPU 102 cancels the forced memory reception setting. Then, the flow proceeds to step S205 where the CPU 102 executes the received data printing processing, which is already described with reference to FIG. 2.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

REFERENCE SIGNS LIST

100 Image forming apparatus
101 Controller unit
102 CPU
103 RAM
107 Printing unit
111 Operation panel
112 Modem
115 External device
119 Power supply unit (Device power source)
121 Backup battery

The invention claimed is:

1. An electronic device comprising:
a volatile memory configured to be supplied with power from a device power source or from a backup battery;
a switching unit configured, in a case where power supply from the device power source is disconnected, to change a power supply source such that power is supplied from the backup battery to said volatile memory;
a reception unit configured to receive data from an external device;
a printing unit configured to print data received by said reception unit; and
a setting unit configured to make a setting to retain data received by said reception unit in said volatile memory until a user's printing instruction is given,
wherein in a case where a voltage of the backup battery is less than a predetermined value, data received by said reception unit is printed by said printing unit without waiting for the user's printing instruction, even if the setting to retain data in said volatile memory is made by said setting unit.

2. The electronic device according to claim 1, further including:
   a deletion unit configured to delete data retained in said volatile memory in a case where the data is printed by said printing unit.

3. A control method for an electronic device having a volatile memory configured to be supplied with power from a device power source or from a backup battery, comprising:
   a switching step, in a case where power supply from the device power source is disconnected, of changing a power supply source such that power is supplied from the backup battery to said volatile memory;
   a reception step of receiving data from an external device;
   a printing step of printing data received in said reception step; and
   a setting step of making a setting to retain data received in said reception step in the volatile memory until a user's printing instruction is given,
   wherein in a case where a voltage of the backup battery is less than a predetermined value, data received in said reception step is printed in said printing step without waiting for the user's printing instruction, even if the setting to retain data in the volatile memory is made in said setting step.

4. A non-transitory computer-readable storage medium storing a program for causing a computer to execute the control method as set forth in claim 3.

5. An electronic device, comprising:
   a volatile memory configured to be supplied with power from a device power source or from a backup battery;
   a switching unit configured, in a case where power supply from the device power source is disconnected, to change a power supply source such that power is supplied from the backup battery to said volatile memory; and
   a control unit configured, in a case where a voltage of the backup battery is less than a predetermined value, not to restrict temporary data storage into said volatile memory from being performed, but to restrict non-temporary data storage into said volatile memory from being performed.

6. The electronic device according to claim 5, wherein the temporary data storage includes causing transmission object data to be retained in said volatile memory before being transmitted.

7. The electronic device according to claim 5, wherein the temporary data storage includes causing print object data to be retained in said volatile memory before being printed.

8. The electronic device according to claim 5, wherein the non-temporary data storage includes causing data received from an external device to be retained in said volatile memory until a user's printing instruction is given.

9. A control method for an electronic device having a volatile memory configured to be supplied with power from a device power source or from a backup battery, comprising:
   a switching step, in a case where power supply from the device power source is disconnected, of changing a power supply source such that power is supplied from the backup battery to the volatile memory; and
   a control step, in a case where a voltage of the backup battery is less than a predetermined value, of not restricting temporary data storage into the volatile memory from being performed, but restricting non-temporary data storage into the volatile memory from being performed.

10. A non-transitory computer-readable storage medium storing a program for causing a computer to execute the control method as set forth in claim 9.

* * * * *